Figure 1:
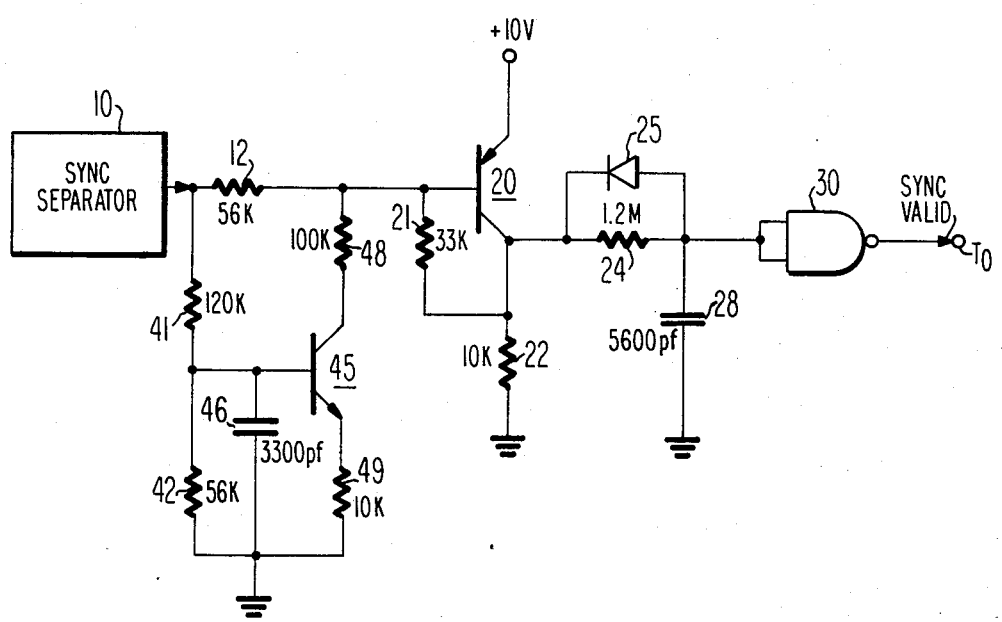

United States Patent

Chen

[11] Patent Number: 4,543,614
[45] Date of Patent: Sep. 24, 1985

[54] VIDEO SYNC VALIDITY DETECTOR

[75] Inventor: Keming J. Chen, San Diego, Calif.

[73] Assignee: RCA Corporaton, Princeton, N.J.

[21] Appl. No.: 573,228

[22] Filed: Jan. 23, 1984

[51] Int. Cl.[4] .................... H04N 5/44; H04N 5/08; H04N 7/02

[52] U.S. Cl. .................... 358/193.1; 358/153; 358/139

[58] Field of Search .............. 358/193.1, 153, 139, 358/149, 150; 307/234

[56] References Cited

U.S. PATENT DOCUMENTS

| | | | |
|---|---|---|---|
| 3,632,864 | 1/1972 | Evans | 178/5.8 R |
| 4,185,299 | 1/1980 | Harford | 358/153 |
| 4,295,165 | 10/1981 | Watanabe et al. | 358/193.1 |
| 4,357,632 | 11/1982 | French | 358/193.1 |
| 4,387,401 | 6/1983 | Henderson et al. | 358/193.1 |
| 4,390,902 | 6/1983 | Chin et al. | 358/192.1 |
| 4,398,303 | 8/1983 | Chin et al. | 455/168 |

*Primary Examiner*—John C. Martin
*Assistant Examiner*—E. Anne Toth
*Attorney, Agent, or Firm*—P. J. Rasmussen; P. M. Emanuel; R. H. Kurdyla

[57] ABSTRACT

A video sync validity detector comprises a peak detector circuit and an average detector circuit both responsive to output signals from a sync separator network. Sync representative signals are provided from the output of the peak detector. The average detector is coupled to the peak detector for inhibiting sync representative outputs therefrom in the presence of sync separator output signals representative of false sync signals of average value.

8 Claims, 2 Drawing Figures

VIDEO SYNC VALIDITY DETECTOR

This invention concerns apparatus for determining the validity of the synchronizing (sync) component of a video signal under various signal conditions. In particular, this invention concerns such apparatus in a television receiver with an electronic tuning system of the signal seeking type.

Examples of signal seeking electronic tuning systems are disclosed in U.S. Pat. No. 4,398,303 of D. Chin et al., and in U.S. Pat. No. 4,390,902 of D. Chin et al. In such tuning systems an automatic fine tuning (AFT) signal representative of the deviation of the picture carrier of the IF signal from a nominal value, e.g., 45.75 MHz in the United States, is sensed by a control circuit associated with the electronic tuning system for the purpose of stopping the signal seeking tuning operation when an RF signal corresponding to an active channel is received. In order to enhance the reliability of the tuning system for stopping only when an RF signal having normally expected picture and sync information is received, the detected video sync signal is typically also sensed. The detected video sync signal is derived from the output of a video sync separator circuit as is commonly found in television receivers. Unless precautions are taken in the circuit for sensing the sync signal, the signal seeking system operation can be stopped under some signal conditions in response to a false sync condition. A false sync condition can result from the presence of weak signals or those containing spurious components such as noise, for example.

In accordance with the principles of the present invention, there is disclosed herein apparatus responsive to signals from a sync separator circuit for providing a given sync representative output signal when a normally expected separated sync signal is received, to the substantial exclusion of other types of abnormal output signals from the sync separator. The disclosed apparatus comprises a peak detector circuit and an average detector circuit, both responsive to signals from the sync separator. A control signal representative of valid sync signals is provided from the output of the peak detector. The average detector is coupled to the peak detector for inhibiting the generation of the valid sync representative control signal in the presence of sync separator output signals of an average value representative of false sync signals.

Figure 2:
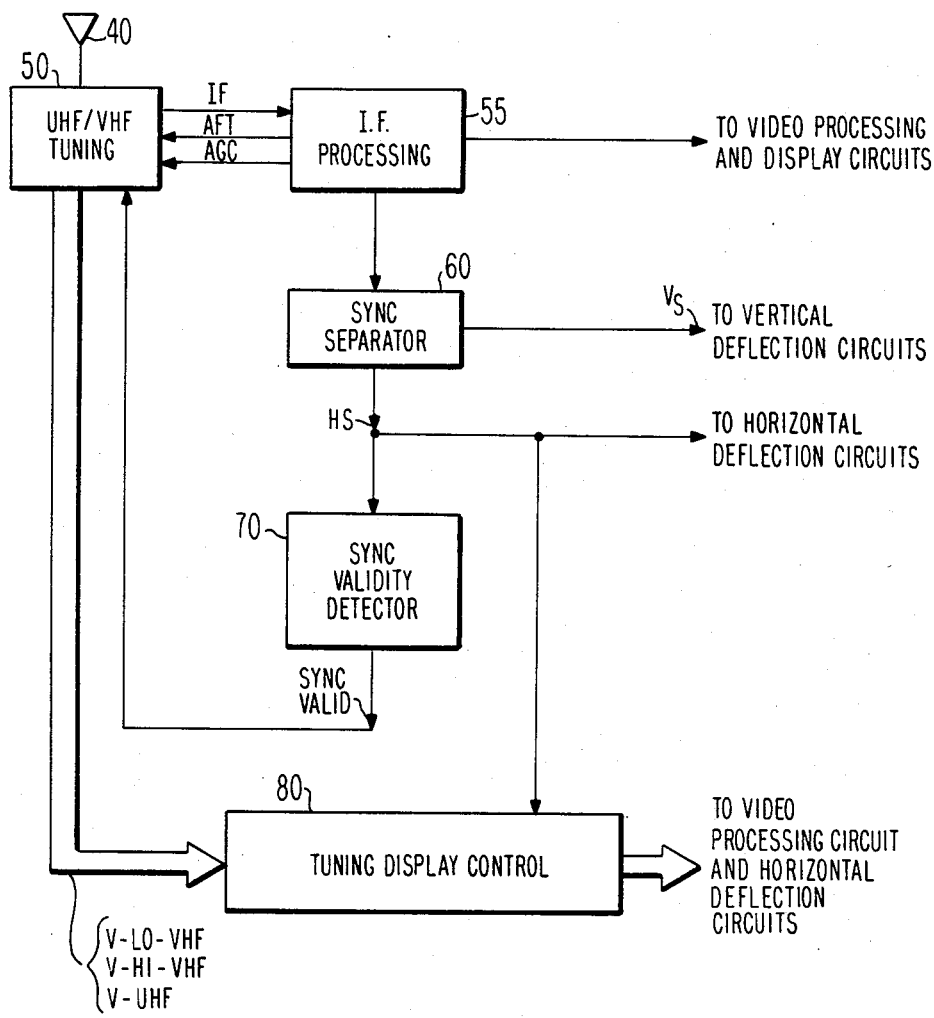

In the drawing:

FIG. 1 shows a circuit constructed in accordance with the present invention for determining the validity of signals from the output of a video signal sync separator; and FIG. 2 shows a portion of a television receiver in block form, comprising a signal seeking electronic tuning system utilizing a sync validity detector circuit constructed in accordance with the present invention.

In FIG. 1, a sync separator network 10, such as employed in a television receiver, comprises circuits for separating a composite sync signal from a composite video signal, including circuits responsive to the separated composite sync signal for providing mutually separated horizontal and vertical sync components of the composite sync signal. A DC coupled horizontal sync signal from sync separator 10 is coupled via a resistor 12 to a peak detector circuit including a PNP switching transistor 20, resistors 22 and 24, a diode 25, and a filter capacitor 28. A resistor 21 provides temperature compensation for transistor 20. A voltage developed across capacitor 28 is coupled via a logic NAND gate 30 arranged as an inverter to an output terminal To, where such voltage appears as a sync validating signal SYNC VALID.

Output signals from sync separator 10 are also DC coupled to an average detector circuit comprising voltage divider resistors 41 and 42, a transistor switch 45, collector and emitter resistors 48 and 49, and a filter capacitor 46. The output signals from the sync separator are coupled to the base input of normally non-conductive transistor 45 via voltage divider 41, 42, where such signals are integrated by capacitor 46. The time constant of the average detector is primarily determined by the values of resistors 41, 42 and capacitor 46. In this example the DC voltage associated with the output of sync separator 10 provides an operating bias for the average and peak detector circuits.

Sync separator 10 comprises circuits for separating the horizontal sync component of a composite television signal. If the normal horizontal sync output signal from sync separator 10 is assumed to exhibit parameters in accordance with the NTSC television broadcast standards employed in the United States, the separated horizontal sync pulses have a width of 4 microseconds, a period 63.5 microseconds, and a positive amplitude of significant magnitude (e.g., a few volts) in the case of an acceptably strong received composite television signal. The time constant and operating parameters of the peak detector circuit are such that an output SYNC VALID pulse of positive amplitude is produced when sync separator 10 produces output pulses of width, period and magnitude parameters corresponding to those of normally expected ("valid") horizontal sync pulses associated with an acceptably strong received television signal.

Transistor 20 is rendered non-conductive in response to normal positive sync pulses from the output of sync separator 10, at which time capacitor 28 is allowed to discharge to ground via diode 25 and resistor 22. The discharging time constant is determined by the values of capacitor 28 and resistor 22. The voltage on capacitor 28 then exhibits a small positive value corresponding to a logic "0" input level to NAND gate 30, whereby the output of gate 30 exhibits a positive logic "1" level for the SYNC VALID output signal. Such output level indicates the presence of correct sync pulses.

When no sync pulses are provided from the output of sync detector 10, transistor 20 remains conductive whereby the charge on capacitor 28 increases in a positive direction sufficient to produce a positive logic "1" voltage level at the input of gate 30. This causes the output of gate 30 and the SYNC VALID signal to exhibit a less positive logic "0" level indicating the absence of sync. In such case transistor 20 conducts such that capacitor 28 charges in a positive direction to produce a "1" logic level at the input of gate 30. The charging time constant of capacitor 28 is determined by the values of capacitor 28 and resistor 24, and is slower than the discharging time constant.

The average detector including transistor 45 and capacitor 46 prevents the development of a positive SYNC VALID output signal and therefore a false tuning operation of an associated tuning system in the presence of high average content signals corresponding to false sync signals from the output of sync separator 10. Such signals may be associated with the false tuning of a television signal sound carrier component as well as to the presence of various types of spurious signals including noise with impulse components, radio frequency interference (RFI), and inteference components such as harmonics generated by deflection circuits of the receiver. The latter signals, for example, can be picked up by the tuning circuits of the receiver and can appear with significant amplitude at the output of the sync separator under weak signal conditions when the signal gain of RF signal circuits associated with the tuning circuits is increased in response to an automatic gain control (AGC) voltage. The voltage across integrating capacitor 46 increases in response to such high average content signals, causing transistor 45 to conduct. The conduction of transistor 45 causes the base voltage of PNP transistor 20 to decrease whereby transistor 20 is rendered conductive, capacitor 28 charges, and the output SYNC VALID signal exhibits a low ("0") logic level, indicating that proper sync signals are not present.

FIG. 2 shows a portion of a television receiver including a signal seeking electronic tuning system utilizing a sync validity detector constructed in accordance with the principles of the present invention as shown and discussed in connection with FIG. 1. With the exception of the circuit details of the sync validity detector as shown in FIG. 1, the system of FIG. 2 corresponds to the electronic tuning and display system shown and described in U.S. Pat. No. 4,390,902—Chin et al., incorporated by reference herein. The sync validity detector circuit can also be used to implement the function of a sync detector network used in a signal seeking electronic tuning system described in U.S. Pat. No. 398,303—D. Chin et al., also incorporated by reference herein.

The electronic tuning system of U.S. Pat. No. 4,390,902 as embodied by the system of FIG. 2 is of the signal seeking type and includes provision for displaying a vertical bar tuning indicator on the screen of the picture tube of the receiver. The position of the bar with respect to channel representative numerals provided on a panel adjacent the kinescope display screen indicates the number of the channel to which the receiver is tuned at a given time. The tuning indicator bar is caused to move across the screen in response to the tuning voltage developed in a signal seeking mode until an active channel is located.

A composite broadcast television signal is received by an antenna 40 and applied to a VHF/UHF tuning control network 50 including RF amplifier stages and a channel selector operated by a viewer for initiating a channel changing operation whereby the next active channel is located by signal seeking apparatus. As discussed in U.S. Pat. No. 4,390,902, tuning network 50 also develops band selection signals V-LO-VHF, V-HI-VHF and V-UHF for switching the frequency range of the tuner. These and other control signals developed by network 50 are coupled to a tuning display control network 80 for determining the position and band indicating color of the displayed vertical tuning indicator bar.

The intermediate frequency (IF) signal developed by tuning network 50 is applied to an IF signal processor 55 which develops automatic fine tuning (AFT) and automatic gain control (AGC) signals which together with the output of a sync validity detector 70 control tuning network 50 to locate active channels.

Detected video signals from IF processor 55 are applied to video signal processing and display circuits of the receiver, and to a sync separator 60 which provides a separated horizontal sync component HS and a separated vertical sync component VS to deflection circuits of the receiver. Horizontal sync signal HS is also applied to an input of tuning display control network 80 for the purpose of generating the vertical tuning bar.

The separated horizontal sync pulse component is also applied to sync validity detector 70 constructed in accordance with the principles of the present invention, the circuit details and operation of which were discussed in connection with the circuit of FIG. 1. The SYNC VALID output signal from detector 70 is coupled to tuning network 50 for controlling the signal seeking tuning operation as discussed in aforementioned U.S. Pat. No. 4,390,902. The sync validity detector circuit as shown and described in connection with FIG. 1 substantially reduces the likelihood of the tuning system responding to false sync signals.

What is claimed is:
1. In a system for processing a video signal including an image synchronizing component, apparatus comprising:
an output terminal;
a sync signal separator responsive to said video signal for providing at an output signals including a separated synchronizing component;
a peak detector circuit responsive to output signals from said sync separator including said synchronizing component and having an output coupled to said output terminal; and
an average detector circuit responsive to output signals from said sync separator and having an output coupled to said output terminal.
2. Apparatus according to claim 1, wherein
said peak detector provides a first output signal at said output terminal in the presence of signals from said sync separator representative of normally expected image synchronizing components, and provides a second output signal in the absence of said normally expected synchronizing components; and
said average detector responds to signals from said sync separator other than said normally expected image synchronizing component, for developing at said output terminal a signal corresponding to said second output signal.
3. Apparatus according to claim 2, wherein
said output of said average detector is coupled to said peak detector for causing said peak detector to provide said second output signal.
4. Apparatus according to claim 3, wherein
said separated synchronizing component corresponds to a horizontal line synchronizing component.
5. In a system for processing a video signal including an image synchronizing component, apparatus comprising:
a sync separator responsive to said video signal for providing at an output signals including a separated synchronizing component;
a peak detector circuit, including a first switching device, responsive to output signals from said sync separator for developing a first output signal in the presence of signals from said sync separator representative of a normally expected synchronizing component, and for developing a second output signal in the absence of said normally expected synchronizing component; and
an average detector circuit, including a second switching device, responsive to the average content of out- put signals from said sync separator and coupled to said peak detector circuit for causing said peak detector circuit to develop said second output signal in response to signals from said sync separator of an average value representative of an abnormal synchronizing component.

6. Apparatus according to claim 5, wherein said peak detector comprises a first switching device with an input control electrode coupled to an output of said sync separator, and an output main current path; and a capacitor coupled to said main current path, said capacitor developing said first and second signals thereacross; and said average detector comprises a second switching device with an input control electrode coupled to said output of said sync separator, and an output main current conduction path coupled to said input control electrode of said first switching device; and an integrating capacitor coupled to said input control electrode of said second switching device.

7. Apparatus according to claim 6, wherein
said first and second switching devices correspond to opposite conductivity type transistors.

8. In a television receiver for processing a video signal including an image synchronizing component, said receiver including a signal seeking electronic tuning system; apparatus comprising:

an output terminal;

a sync signal separator responsive to said video signal for providing at an output signals including a separated synchronizing component;

a peak detector circuit responsive to output signals from said sync separator including said synchronizing component and having an output coupled to said output terminal;

an average detector circuit responsive to output signals from said sync separator and having an output coupled to said output terminal; and means for coupling said output terminal to a control input of said electronic tuning system.

* * * * *